United States Patent [19]

Whitman, Jr.

[11] 4,090,201
[45] May 16, 1978

[54] RATE AUGMENTED STEP TRACK SYSTEM

[75] Inventor: John G. Whitman, Jr., Melbourne, Fla.

[73] Assignee: Harris Corporation, Cleveland, Ohio

[21] Appl. No.: 721,386

[22] Filed: Sep. 8, 1976

[51] Int. Cl.² .............................................. G01S 3/44
[52] U.S. Cl. .................................. 343/117 R; 343/7.4
[58] Field of Search ...................... 343/117 R, 162, 7.4

[56] References Cited

U.S. PATENT DOCUMENTS

| | | | |
|---|---|---|---|
| 3,324,472 | 6/1967 | Sundberg et al. | 343/117 R |
| 3,798,649 | 3/1974 | Holing | 343/117 R |
| 3,842,420 | 10/1974 | Rabow | 343/117 R |

Primary Examiner—Maynard R. Wilbur
Assistant Examiner—Richard E. Berger

[57] ABSTRACT

A step track antenna system adapted for tracking rapidly moving signal sources, in which systematic step commands cause antenna rotation in fixed angular increments about each of two orthogonal axes so as to maximize the strength of the received signal. In each axis, the direction, or polarity, of each step is selected in response to a comparison of the signal strength existing before and after the last step that was taken about that axis. A determination is made from this comparison as to which direction a step must be taken in, to produce an increase in signal strength. The step tracking rate is augmented by generating a signal representative of the time integral of the polarity indications. The antenna servo system responds to this signal by imparting a corresponding, continuous rate of motion to the antenna. The effect of this rate augmentation is to reduce the amount of antenna motion which must be accounted for by the step tracking process.

9 Claims, 1 Drawing Figure

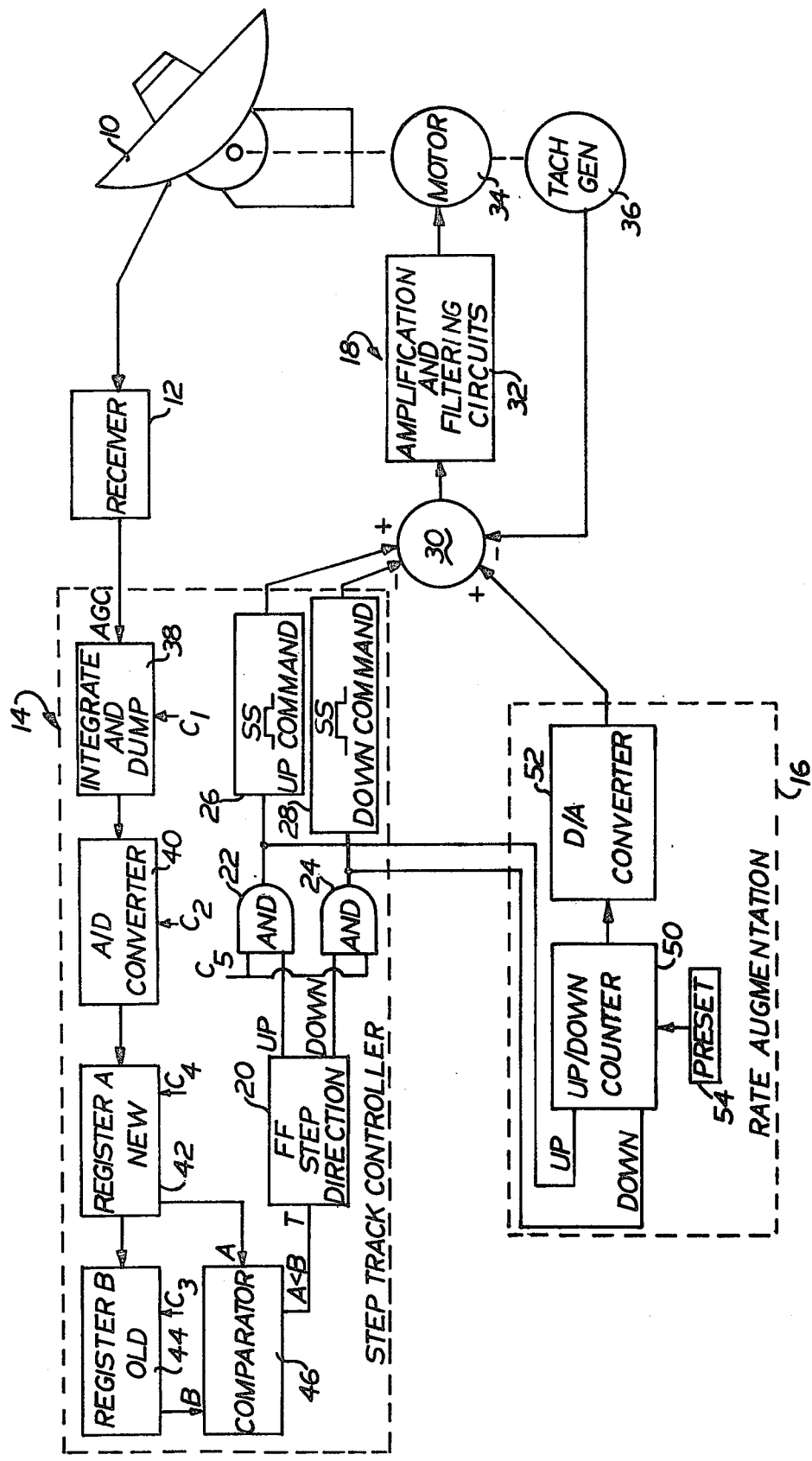

RATE AUGMENTED STEP TRACK SYSTEM

BACKGROUND OF THE INVENTION

The present invention relates to antenna tracking systems, and more particularly to a modified step track antenna system.

Highly directional antennas are used in the reception of the weak radio signals originated by satellites or other small or distant signal sources. To insure maximum signal integrity, the antenna must be oriented with the boresight axis (i.e. direction of maximum sensitivity) very precisely aimed at the signal source. Signal source motion complicates the problem and necessitates the provision of means for tracking the source so as to prevent loss of signal. Tracking systems employing error-sensing feeds, e.g. pseudomonopulse or conical-scan systems, can secure the desired result but are generally both complex and costly.

Step track antenna systems provide automatic tracking of satellites and other moving signal sources without the cost and complexity associated with these other antenna tracking systems. In step track systems, the antenna is aimed at the signal source through rotation in discrete angular steps about two orthogonal axes. The direction in which these steps are taken is determined during the interval between steps by comparing the then existing signal strength with the signal strength prior to the last step. If it is decided that the signal strength has increased, a further step is taken in the same direction as the previous step. If the signal strength has diminished, a step in the opposite direction is taken. A system of this general type is described in U.S. Pat. No. 3,842,420.

Rudimentary step track systems of this nature perform adequately in the tracking of slowly moving signal sources, but are not easily adapted for use in applications requiring tracking of rapidly moving signal sources. Some additional measure can be added to the maximum tracking rate by increasing the size or frequency of the positioning steps. Increases in the size of the steps, however, are necessarily accompanied by corresponding decreases in pointing accuracy. The maximum rate at which the steps can be taken, on the other hand, is fixed both by mechanical limitations and by the amount of time required between the steps in order to generate an accurate representation of the average signal strength. For these reasons, neither of the stated alternatives is entirely satisfactory.

This difficulty can, in large part, be circumvented by impressing a constant motion, hopefully approximating that of the signal source, onto the antenna boresight. The effect is to reduce the amount of boresight motion which must be accounted for by the step tracking process. This approach, however, only serves to increase the average rate of antenna movement and does not increase the dynamic range thereof. The antenna may still be incapable of automatically tracking signal sources displaying high angular dynamics as, for example, a satellite traveling in a highly elliptical orbit. Signal source acceleration may cause the boresight velocity to lead or lag the signal source velocity by more than can be compensated for by the step tracking process. When this occurs, the signal will be lost.

SUMMARY OF THE INVENTION

It is therefore an object of the present invention to provide a modified step track system which is adapted to track rapidly moving signal sources by imparting a continuous motion to the antenna boresight.

It is an additional object of the present invention to provide method and apparatus for changing the continuous velocity thus imparted to the antenna in accordance with step polarity decisions so as to compensate for signal source acceleration.

It is yet another object of the present invention to provide a rate augmented step tracking system in which the time integral of previous step polarity decisions is used to control the magnitude and direction of a continuous motion which has been imparted to the antenna.

In accordance with the present invention, a modified step track system is described in which polarity indications of step commands are provided to an accumulator, for example a counter, in order to produce an indication of whether the antenna is generally leading, generally lagging, or generally tracking the target. Antenna drive means are included which respond to the indication provided by the accumulating means to impart a corresponding continuous motion to the antenna, which motion serves to compensate for relative motion between the antenna boresight and the signal source.

In accordance with another aspect of the present invention, a rate command is generated for controlling continuous motion of the antenna. Means are provided for systematically altering the rate command, and for detecting whether each alteration has produced an improvement in signal characteristics. Means are further provided for controlling the polarity of a succeeding alteration of the rate command in accordance with the results of this determination.

DESCRIPTION OF THE DRAWING

The foregoing and other objects and advantages of the present invention will become more readily apparent from the following detailed description of the preferred embodiments, as taken in conjunction with the accompanying FIGURE which is a part hereof and which illustrates a block diagram of a presently preferred embodiment of the present invention.

DETAILED DESCRIPTION

Although the detailed description will be made with specific reference to a system for tracking radio signal sources, such as satellites, it will be appreciated that the invention has broader application to the tracking of energy sources in general. Thus, the invention is easily adapted to the tracking of sources of other types of energy, such as light, sound, radioactivity, etc. Further, the present invention may be used both to track targets which originate signals and those from which signals are reflected. All of these applications and others are within the contemplation of the present invention.

Referring now to the FIGURE, there is shown an antenna 10 which provides reception of a signal to be processed by a receiver 12. Receiver 12 includes means for providing an automatic gain control (AGC) signal whose level is generally indicative of the received signal strength. The AGC signal is directed to a step track controller 14 whose tracking rate is augmented through use of a rate augmentation circuit 16. The tracking commands produced by circuits 14 and 16 are directed to an antenna drive servo system 18 which controls the movements of the antenna 10 about one axis of rotation. It will be appreciated that a second system for providing controlled motion about a second axis of rotation would generally be provided, together with an axis controller for providing a tracking step about first one, and then the other of the two axes. Such a second system would also includes a step track controller, rate augmentation circuit, and antenna drive servo system, each being substantially identical to those described hereinafter.

Step track controller 14 provides systematic stepping commands to servo system 18. These step commands need not necessarily be strictly periodic; a pseudo-random stepping time sequence is often employed to avoid the effects of periodic interference on a communications link. For the purposes of the ensuing discussion, however, the stepping commands will be treated as periodic, having a fixed repetition rate and magnitude, but a selectable polarity. The direction in which each step is taken is determined by the polarity of the stepping command. This polarity is determined by a step direction flip-flop 20 having outputs for commanding movement in either one of two directions. In the drawing, a high level signal on the UP output of flip-flop 20 will provide a movement step in the upward direction, while a high level signal on the DOWN outputs of flip-flop 20 will produce a movement step in the opposite, or downward direction. The UP and DOWN outputs of flip-flop 20 are respectively directed to AND gates 22 and 24, which serve to enable the passage of pulses produced by clock $C_5$ to either an UP command circuit 26 or a DOWN command circuit 28. Since one, but not both, of the outputs of flip-flop 20 is high at any given time, each clock pulse produced by clock $C_5$ will be gated by one, but not both, of AND gates 22 and 24 to its respective command circuit.

Command circuits 26 and 28 are single-shot devices which produce a pulse having a predetermined amplitude and width upon being triggered by a trigger pulse gated by the corresponding AND gate. These step commands produced by circuits 26 and 28 are each directed to a summing circuit 30.

The output of summing circuit 30 rests at a selected DC level. The DC level is set by rate augmentation circuit 16, which will be described hereinafter. The UP commands produced by circuit 26 produce corresponding positive excursions from the DC level on the output of summing circuit 30, while DOWN commands produced by circuit 28 produce corresponding negative excursions from the DC level. The output of summing circuit 30 is directed, through amplification and filtering circuits 32, to servo motor 34. Motor 34 is a D.C. servo motor which responds to positive signals to produce antenna movement in one direction, and to negative signals to produce antenna movement in the opposite direction. A tachometer generator 36 is employed to provide feedback to summing circuit 30 and thereby insure close control of the velocity at which antenna 10 is stepped. It will thus be seen that antenna 10 will be positioned through incremental movement in two directions.

The direction in which the increments are taken is determined by comparing the average signal strength before and after the previous incremental step. Integrate and dump circuit 38 responds to the AGC signal produced by receiver 12 to generate an analog signal having a magnitude indicative of the average existing signal strength. This signal is converted to a corresponding digital signal by analog-to-digital (A/D) converter 40. The digital signal is then clocked into register 42. Following the next incremental step of antenna 10, the digital signal contained within register 42 is transferred to a second register 44, while a new digital signal is transferred into register 42. Because of this, register 42 will contain a digital signal representing the existing signal strength, while register 44 will contain a digital signal representative of the signal strength prior to the last step. Comparator 46 compares the contents of registers 42 and 44 to determine whether the previous step lead to an increase or decrease in signal strength. The output of comparator 46 will only go to a high level when the digital signal in register 42 is less than the digital signal in register 44, thus indicating that the last step produced a decrease in signal strength. The output of comparator 46 is connected to the trigger input to flip-flop 20 and will cause triggering thereof whenever the output of comparator 46 goes to a high level. This will cause the UP and DOWN outputs of flip-flop 20 to change states, thus in turn causing the next succeeding step to be taken in the opposite direction from that in which the previous step was taken.

Because of this, a pulse will be gated by AND gate 22 whenever the previous step was in an UP direction and led to an increase in signal strength, or was in a DOWN direction and led to a decrease in signal strength. Similarly, a pulse will be gated by AND gate 24 whenever the previous step was in a DOWN direction and led to an increase in signal strength, or was in an UP direction and led to a decrease in signal strength.

Clock signals $C_1$, $C_2$, $C_3$, $C_4$, and $C_5$ are used to produce the described sequence of operation. The circuitry for generating these clock signals will not be described since the design of timing circuits of this type is well within the competence of an experienced engineer. The generation of these signals on a cyclical basis will result in the sequential incremental movement of antenna 10 in such a direction as to maximize the strength of the signals received thereby, subject to the limitations described in the BACKGROUND.

It will be observed that the polarity of the step commands produced by step track controller 14 will generally reflect the motion of the signal source. If, for example, the signal source is moving in a generally upward direction, a greater number of UP commands than DOWN commands will be generated by step track controller 14 so as to cause the movement of the antenna boresight to reflect this generally upward motion. If, on the other hand, the signal source is moving in a generally downward direction, more DOWN commands than UP commands will be produced by step track controller 14. Finally, if the signal source is stationary and the antenna boresight is accurately pointed, the number of UP commands will be equivalent to the number of DOWN commands and no net change of position will result. By providing circuitry for recognizing these patterns, a rate augmentation scheme can be derived for adding a controlled, continuous tracking velocity to the antenna boresight.

Rate augmentation circuit 16 includes a digital UP/DOWN counter which serves to implement this function. Counter 50 has count-up and count-down inputs. A pulse applied to one of these inputs will respectively cause the digital signal stored within counter 50 to be incremented or decremented. The digital "sum" signal contained within counter 50 is directed to a D/A convertor 52 which converts the accumulated count into a corresponding analog signal. This analog signal is connected to summing circuit 30, and sets the DC level of its output. Since, as previously noted, motor 34 is responsive to DC signals, this DC level imparted by digital-to-analog convertor 52 will cause motor 34 to be continuously energized, thus imparting a corresponding motion to antenna 10. The steps produced by step track controller 14 will therefore be augmented by this continuous tracking rate.

The algorithm employed in increasing and decreasing the count contained within counter 50 will preferably provide an incrementing of the count signal whenever an UP step has been taken and has led to an increase in signal strength, or a DOWN step has been taken and has led to a decrease in signal strength. Similarly, it is desired that the accumulated count in counter 50 should be decremented whenever a DOWN step has been taken and has led to an increase in signal strength, or an UP step has been taken and has led to a decrease in signal strength. This algorithm is precisely the same algorithm used to determine the polarity of the upcoming step. Consequently, the output of AND gates 22 and 24 can respectively be directed to the count-up and count-down inputs of counter 50 to implement this algorithm. The sum signal contained within counter 50 will therefore comprise a running total of past polarity decisions, and will thus correspond to the time integral of the polarities of the step commands.

When constructed in this manner, it will be appreciated that a continuous motion is imparted to antenna 10 and is altered in accordance with the step polarity decision. Whenever the signal source is moving upward more rapidly than the continuous motion imparted to the antenna boresight, more UP commands than DOWN commands will be produced by step track control 14 and will result in a net incrementing of the count contained within counter 50. This will produce a corresponding increase in the continuous motion imparted to antenna 10. When this continuous motion accurately reflects the motion of the signal source, the number of UP commands will be balanced by an equal number of the DOWN commands, and no net change will result in the count contained within counter 50. Consequently, the continuous motion of antenna 10 will remain unchanged.

In the majority of instances, a rough approximation of the direction and velocity of the signal source will be known a priori. This information can be used to provide an initial count within up/down counter 50 which approximates the signal source motion. Consequently, a "preset" circuit 54 may be included for manually setting the initial count contained in up/down counter 50.

Rate augemntation circuit 16 could be used to completely supplant the operation of step track controller 14. In other words, the step commands produced by command circuits 26 and 28 are no longer necessary in view of the operation provided by rate augmentation circuit 16, and could consequently be deleted. When used in this manner, the combination of circuits 14 and 16 would operate as a rate controller, rather than a position controller. Thus, a rate command would be generated which would cause continuous motion of antenna 10. The rate command would be altered on a systematic basis and the signal strength before and after the most recent alteration would be compared by comparator 46. The results of this comparison would determine the direction of change of the next succeeding alteration of the rate command produced by counter 50.

Various other alterations can also be conveniently employed to change the characteristic operation of the circuit for different types of signal sources. If a rapid acquisition rate is desired, the up/down counter 50 may be incremented by an amount which is proportional to or related in accordance with some monotonically-increasing, nonlinear functional relationship to the length of the present string of steps having the same polarity, rather than in the described linear manner. The effect of this modification would be to permit the rate command to reach its final value more quickly under circumstances in which a rapidly moving target causes a long string of steps having the same polarity.

Alternatively, it may be desirable to desensitize the operation of the circuit by only incrementing or decrementing counter 50 upon receipt of a number of steps having the same polarity. This could be conveniently accomplished by increasing the number of binary bits in counter 50, and only connecting the outputs corresponding to the most significant bits to digital-to-analog convertor 52.

Also, some combination of these two schemes could be employed to provide a rapid acquisition rate in the first instance, while desensitizing the counter to further changes in the rate of motion of the antenna after the signal has been acquired.

Although the invention has been described with respect to a preferred embodiment, it will be appreciated that further alterations and modifications in addition to those listed above can be employed without departing from the spirit and scope of the invention as defined in the appended claims.

What is claimed is:

1. Apparatus for controlling the tracking rate of an antenna to provide optimum reception of a signal and comprising:
    tracking means for imparting a continuous tracking rate to said antenna;
    rate alteration means for systematically changing said tracking rate imparted to said antenna by said tracking means;
    signal change detection means responsive to signals received by said antenna for determining, following each said change of said tracking rate, whether said change produced an improvement in signal reception; and,
    polarity selection means responsive to said signal change detection means for selecting the polarity of each said change of said tracking rate produced by said rate alteration means.

2. Apparatus as set forth in claim 1 wherein said rate alteration means includes means for systematically changing said tracking rate by an amount having a preselected magnitude and selectable polarity, said polarity being selected by said polarity selection means.

3. Apparatus as set forth in claim 1 wherein said tracking means includes counter means for providing a sum signal indicative of a desired tracking rate, and drive means responsive to said sum signal provided by said counter means for imparting said continuous tracking rate to said antenna in accordance therewith and wherein said rate alternation means serves to systematically cause said counter means to incrementally alter said sum signal.

4. Apparatus as set forth in claim 3 wherein said rate alteration means includes means for systematically providing increment and decrement commands to said counter means, and further wherein said counter means is responsive to said increment and decrement commands to respectively increase and decrease the value of said sum signal by a selected amount.

5. Apparatus as set forth in claim 4 wherein said tracking means further includes means for presetting said sum signal provided by said counter means to a selected initial value.

6. A method for controlling antenna tracking comprising the steps of cyclically providing a step command having a predetermined magnitude and a selectable polarity to an antenna drive servo motor, selecting the polarity such that the antenna is stepped to maximize returns, supplying a servo command to the servo motor indicative of continuous motion, accumulating the time integral of the polarities of the step commands, and varying the magnitude of the servo command in response to the time integral.

7. A method according to claim 6 wherein the step of supplying a servo command includes the step of preselecting a commanded rate.

8. A method according to claim 6 wherein the step of accumulating the time integral of the polarities of the step commands comprises supplying a signal indicative of the polarity of each step to a counting circuit.

9. A method according to claim 6 wherein the step of varying the magnitude of the servo command in response to the time integral includes the step of adding the time integral to the preselected rate.

* * * * *